March 10, 1953  N. R. KRAUSE  2,630,667
HEADER CONTROL FOR COMBINES
Filed April 15, 1948  2 SHEETS—SHEET 1

Inventor:
Norman R. Krause
By Soans, Pond & Anderson
Attys

March 10, 1953 — N. R. KRAUSE — 2,630,667
HEADER CONTROL FOR COMBINES
Filed April 15, 1948 — 2 SHEETS—SHEET 2

Inventor:
Norman R. Krause
By Soans, Pond & Anderson
Attys

Patented Mar. 10, 1953

2,630,667

UNITED STATES PATENT OFFICE 2,630,667

HEADER CONTROL FOR COMBINES

Norman R. Krause, Racine, Wis., assignor to J. I. Case Company, Racine, Wis., a corporation of Wisconsin Application April 15, 1948, Serial No. 21,116

11 Claims. (Cl. 56—208)

The present invention relates generally to combination harvester-threshers or combines and to like apparatus having adjustable crop gathering headers. In particular the invention relates to a control for such headers, the control being operable to adjustably position the header relative to the ground.

When harvesting grain and other crop materials with a combine, it is important that the crop be processed at maturity and under definite conditions of moisture content, both in the straw and in the grain. These optimum conditions usually exist for only a few days, and in normal combine operation it thus becomes necessary to harvest substantial areas in short periods of time in order to obtain grain of the highest quality. Desirably, therefore, the combine should be capable of operation at maximum speed and maximum efficiency at all times.

Generally speaking, the speed of operation of combines and like apparatus depends to a very large extent upon the amount of straw which is cut with the grain. Severing the stalks of grain close to the grain head increases the speed of operation, because when the stalks are so severed, the harvester handles a minimum volume of straw for a given amount of grain, most of the straw remaining in the field and the material going to the threshing mechanism being substantially all grain. However, due to variations in moisture and soil conditions, the grain in a given field grows at varying heights, and in order to cut the grain heads with a minimum of straw, it is necessary for the combine operator to continuously adjust the height of the cutter bar which forms a part of the header.

The principal object of the present invention, therefore, is the provision of an improved, easily operated header control for rapidly and accurately adjusting the height of headers for combines and like apparatus, so as to make possible more efficient combine operation and higher combine speeds. As will hereinafter appear, this object is accomplished by the provision of means for locking the header in a selected position, power operated means for accomplishing easy and rapid, step-free adjustment of the height of the header and the cutter bar, and means for operating the locking and height adjusting means from a position remote from the header. Other objects and various further advantages of the invention will be made apparent by reference to the following description and the accompanying drawings of an illustrative embodiment thereof.

In the drawings:

Fig. 4 is an elevational view, partially in section, showing a resilient lock mechanism provided for maintaining the header in a predetermined position;

Fig. 5 is a sectional view taken on line 5—5 in Fig. 4; and

As is well known, combines are of two general types; the self-propelled type, which is adapted to move about the field under its own power, and the pull-type, which is moved about a field by a draft vehicle, such as a tractor or the like. The improved header control of the present invention is adapted for use with either type combine, but since the pull type is more commonly used, the header control is illustrated in combination with a harvester of that type. The illustrated combine includes a main frame 11, a crop gathering header 13 hingedly supported on the forward end of the frame 11, and a threshing cylinder, with the usual grain cleaning and straw separating mechanisms, supported within a housing 15 on the frame 11. Conventional, spaced-apart, support wheels 17 are journalled on the frame 11 so that the implement may be moved about a field during use.

Figure 1:
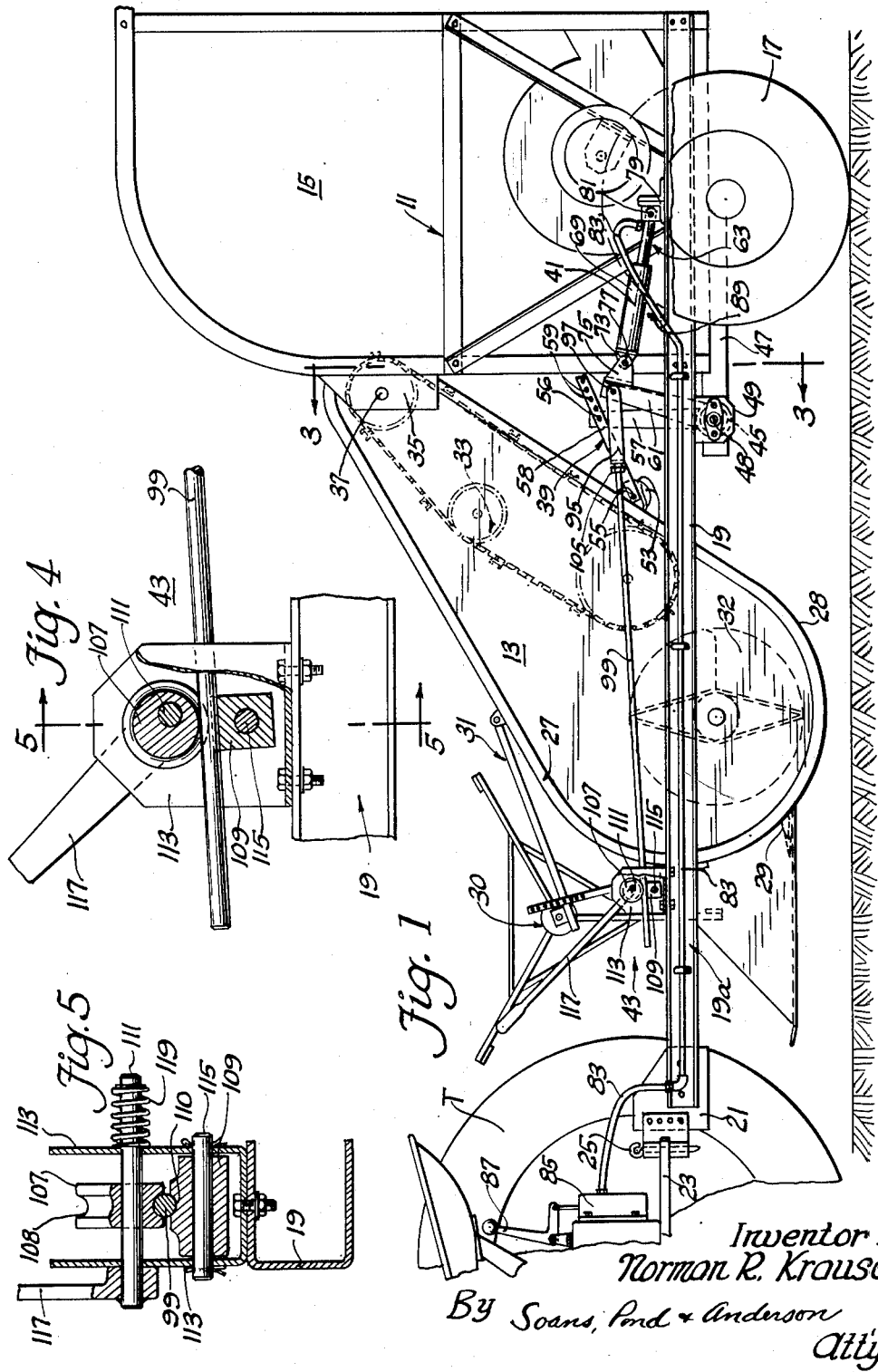
Fig. 1 is a fragmentary, elevational view of a combine having a header control in accordance with the invention.

The main frame 11 is fabricated from suitable structural members to provide a rigid supporting structure for the mechanism, and includes a pair of horizontally disposed, longitudinally extending channel members 19 which extend forwardly to form a V-shaped drawbar 19a of conventional design by which the harvester may be drawn about a field. A suitable hitch plate 21 (Fig. 1) is attached to the forward or apex end of the drawbar 19a and that plate is adapted to be connected to the draft bar 23 of the associated tractor T by a hitch pin 25.

The header 13 is adapted to sever the stalks of standing grain and to convey these cut stalks to the threshing mechanism located within the housing 15. The header 13 includes a sub-frame 27, which is adapted to support a grain pan 28 and the various crop conveying elements, and a cutter bar 29 which is disposed along the forward edge of the sub-frame 27 to engage the standing crop. A suitable reel 30 for guiding the crop materials is supported by a pair of brackets 31 mounted on the forward portion of the header sub-frame 27. In the embodiment of the invention illustrated, a transversely extending auger 32 is utilized to move the grain cut by the cutter bar 29 along the grain pan 28, but any of the known crop conveyors could be used, as for example a transversely extending draper or a raddle type conveyor. The cut crop is conveyed from the grain pan 28 to the threshing mechanism by a belt or raddle type elevator conveyor 33.

Figure 3:
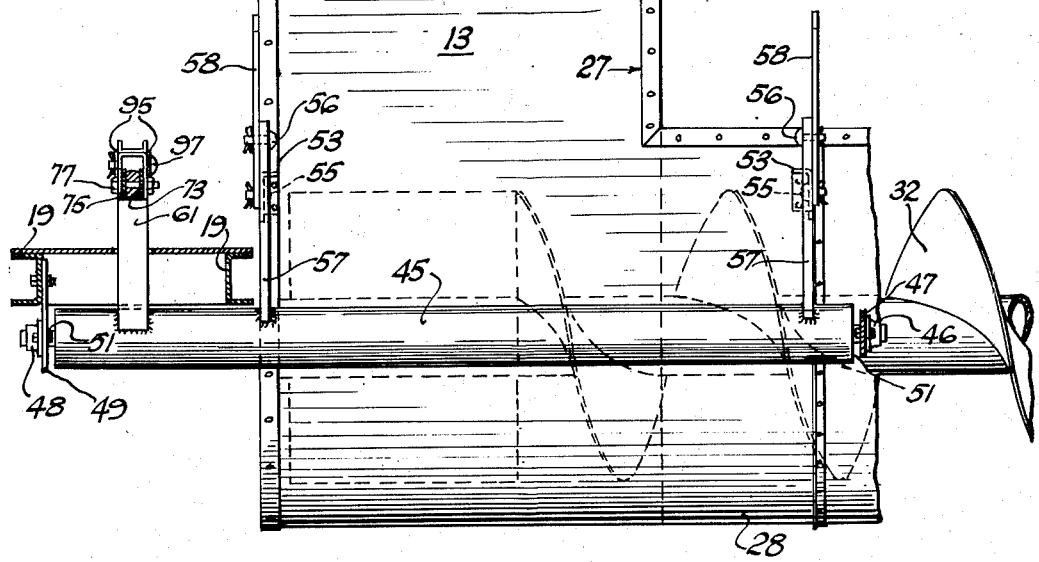
Fig. 3 is an enlarged sectional view taken on line 3—3 in Fig. 1.

As before pointed out, the header 13 is hingedly connected to the main frame 11 so that the height of the cutter bar 29 can be adjusted relative to the ground. The hinge connection includes a pair of supporting, bearing brackets 35 on the main frame 11 (Figs. 1 and 3), and a horizontally disposed, transversely extending, shaft 37 which engages the bearing brackets to support the header sub-frame 27.

The header control, which positions the header sub-frame 27 and the cutter bar 29 relative to the main frame 11 of the harvester, includes an adjusting linkage 39, which is disposed between the main frame 11 and the header sub-frame 27, power-operated means 41 for effecting the movement of the adjusting linkage, and a locking means 43 for resiliently maintaining the header in a predetermined position, while permitting floating action which absorbs shocks caused by operating the harvester in a rough field. The adjusting linkage 39 includes a transversely extending, tubular rock shaft 45. One end of the rock shaft 45 is journalled in a suitable bearing 46 on a section 47 of the main frame 11, and the other end of the rock shaft 45 is journalled in a bearing 48 which is supported on a bracket 49 attached to one of the channel members 19 constituting the drawbar 19a.

A pair of aligning, pivot brackets 53 are fastened to the two sides of the header sub-frame 27, and each of these brackets is connected to the rock shaft 45 by a two element, adjustable linkage and a pair of horizontally extending pivot pins 55 and 56. Each of the adjustable linkages includes a header supporting arm 57 which is welded to the rock shaft 45 and a link 58 having a plurality of spaced adjusting holes 59 provided in one end thereof. Each of the arms 57 is connected to the associated link 58 by one of the pins 56, and the spaced holes 59 provide several ranges of adjustment for the header. The other end of each of the links 58 is connected to one of the brackets 53 by one of the pins 55. The rock shaft 45 is connected to a power-operated, adjusting means 41 by a rigid control-arm 61 which is welded, or otherwise secured, to one end of the rock shaft 45.

The power-operated control means 41, in the illustrated embodiment of the invention, is a hydraulic ram 63 of any suitable design and includes the usual cylinder 65 and piston 67. An outer shell 69 and a dust seal 71 are provided around the ram cylinder 63 to keep it free from foreign particles. The outer shell 69 has a closed end which is rigidly fastened to the piston rod 67 of the ram 63 and which is provided with a connecting lug 73. A clevis 75 is attached to the upper end of the control arm 61, and this clevis is pivotally connected to the lug 73 on the ram shell 69 by means of a transversely disposed pivot 77, or the like. The closed end of the ram cylinder 65 is hingedly connected to a stationary bracket 79 on the main frame 11 by means of a pin 81. The ram structure in the implement is connected to a hydraulic pump 85 on the tractor T by means of a flexible hose or conduit 83 which may be capable of a slight expansion when it is stressed under additional pressure. The hydraulic pump 85 is controlled by the usual lever 87, which may be located adjacent the operator's position on the tractor T. The operation of the ram will rotate the rock shaft 45; thus, the operator of the tractor can raise or lower the header 13 by merely actuating the convenient ram-control lever 87.

In order to limit the downward movement of the header 13, a stop 89 is located on the frame of the implement below the outer shell 69 of the ram 63. The stop 89 includes an adjustable stop plate 91 (Fig. 2) which may be locked in position by a bolt 93. The lowermost position of the header is determined by the position of the stop plate 91 and by the location of the pivot pin 56 along the link 58. Thus by proper location of the pivot pin 56 in one of the holes 59, and by the proper adjustment of the stop plate 91, the minimum height of the header can be varied between fairly wide limits.

Figure 2:
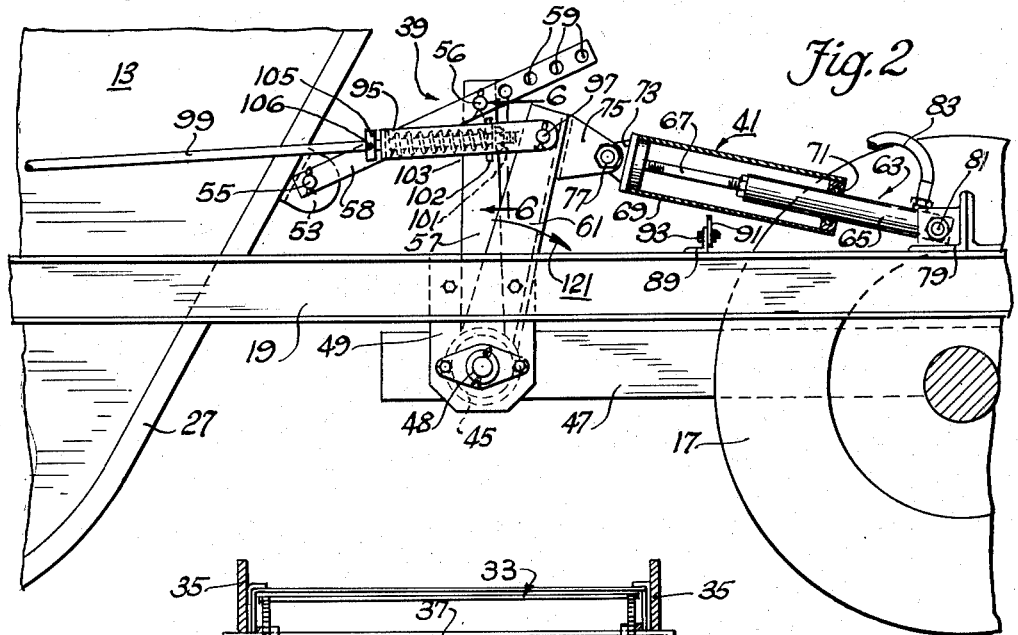
Fig. 2 is an enlarged fragmentary, elevational view of a linkage which forms a part of the header control illustrated in Fig. 1.
Figure 6:
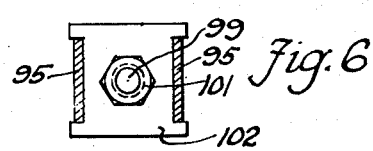
Fig. 6 is an enlarged sectional view taken on line 6—6 in Fig. 2.

The locking means 43 for resiliently maintaining the header 13 in the desired position includes a forwardly extending tie rod 99, a resilient connection between the rear end of the tie rod 99 and the control arm 61 (which is integrally connected to the rock shaft 45) and a cam lock 43 operable from the operator's position on the tractor T. The resilient connection between the tie rod 99 and the control arm 61 comprises an elongated, U-shaped member 95, whose closed inner end is arranged to slide on the tie rod 99 and whose open ends straddle and are attached to the upper end of the control arm 61 by means of a pivot pin 97. The rearward end of the rod 99 is threaded to receive a locking nut 101 (Fig. 2). A guide plate 102, which slidably engages the U-shaped member 95, is slidably mounted on the rearward end of the rod 99 and a compression spring 103 is disposed about the rod and acts between the guide plate 103 and the closed end of the U-shaped member 95 to provide a resilient shock absorbing connection (Figs. 2 and 6). A stop collar 105 is attached to the rod 99 forwardly of the U-shaped member 95 by means of a pin 106, and the spring 103 is stressed sufficiently, by tightening the nut 101, that the weight of the header may be supported thereon with only a slight additional compression of the spring. The stop collar 105 limits rearward movement of the rod 99 under the biasing action of the spring 103, and when the full weight of the header is not acting upon the compression spring 103, the closed end of the U-shaped member 95 abuts the adjacent surface of the stop collar 105.

The forward end of the tie rod 99 may be held rigidly in any selected position by means of the cam lock 43 which includes a cam 107 and a seat block 109 (Figs. 4 and 5). The cam 107 is keyed, or otherwise attached, to a stub shaft 111 which is journalled in a channel shaped bracket 113, the bracket 113 being bolted to the drawbar 19a. The seat block 109 is rectangular in cross section and is attached to a hinge pin 115 which is rotatably supported in the bracket 113 below the cam 107. The relative positions of the cam 107 and the seat block 109 are such that the tie rod 99 is forced against the upper surface of the seat block 109 when the cam 107 is rotated about its shaft 111. The periphery of the cam 107 has a concave groove 108 extending therearound and the upper surface of the seat block 109 is provided with a similarly shaped longitudinally extending groove 110 (Fig. 5). The grooves 108 and 110 are adapted to extend around a portion of the tie rod 99 so as to guide the rod 99 and to increase the area of contact between the tie rod 99 and the seat block 109. Thus adequate frictional forces between the seat block 109 and the rod 99 can be maintained by a relatively small movement of the cam 107.

A locking lever 117, for actuating the cam lock 43, is rigidly affixed to one of the outer ends of the stub shaft 111, and extends in a forwardly direction to a position within easy reach of the operator of the tractor. The stub shaft 111 is provided with a compression type spring 119, which holds the contacting surfaces of the bracket 113 and the locking lever 117 in frictional engagement with each other. The friction created between these surfaces by the spring 119 is sufficient to hold the lever 117 in any desired position when the tie rod 99 is not locked in place.

Movement of the header 13 in a downward direction tends to rotate the header positioning or control arm 61 in a clockwise direction, as indicated by the arrow 121 in Fig. 2, and when the cam lock has been set, this movement is resisted by the tie rod 99, which is mechanically connected to the arm 61 through the spring 103, as above described. The arrangement of the parts of the cam lock is such that any abnormal rearward force exerted on the tie rod 99, for example as a result of the header striking an obstruction, will cause the locking cam 107 to rotate to more tightly engage the tie rod 99. The spring 103 acts as a shock absorber between the arm 61 and the locking means 43, and if the pressure within the hydraulic cylinder is reduced, the header will be maintained in its selected position by the resiliency of the spring 103.

During operation, when it is desired to raise the header, it is necessary merely to move the hydraulic pump control lever 87 to the operative position, thereby causing the ram 63 to lengthen and actuate the header positioning and adjusting linkage 39. At the same time the operator should release the cam lock 43 by moving the locking lever 117 rearwardly, but if he should forget to do this the forward movement of the tie rod 99 will rotate the cam 107 a sufficient amount to release the lock automatically and allow the tie rod 99 to move freely through the cam lock 43. When the desired height is reached the operator returns the hydraulic pump control lever 87 to the neutral position and re-engages the cam lock against the tie rod 99. When it is desired to lower the header, the operator releases the cam lock 43 and moves the hydraulic pump control lever 87 to decrease the fluid pressure in the system. When the desired header height is reached, the cam lock 43 is reset and the hydraulic pump control lever 87 is returned to the neutral position, whereupon the apparatus will be in the normal operating condition.

Combines equipped with header adjusting means as described in the foregoing can be operated at much higher speeds and at correspondingly higher efficiencies than the structures heretofore known in the art. This results primarily from the fact that the height of the header is at all times under the complete and convenient control of the combine operator. The arrangement of the structure of the invention is such that it is a very simple matter to raise or lower the header as the height of the grain varies during the harvesting operation. Instead of setting the header sufficiently low to cut all of the grain which will be encountered in any given section of the field, the operator may watch the grain as the harvesting operation proceeds, and may continuously adjust the header to take advantage of the increased speed of operation which results from minimum straw intake. Actually, the adjustment of the height of the header requires little more than an occasional movement of the cam locking lever, accompanied by operation of the hydraulic mechanism.

In addition to providing an improved control structure, apparatus in accordance with the invention provides an independent, positive, header locking means whenever the power operated actuating means is disconnected. Under such circumstances the locking means will maintain the header in the desired elevated position so that the operator will have proper working access to the cutting mechanism and the other mechanical elements.

The arrangement of the header control is such that it can be conveniently adapted for use with the hydraulic systems commonly employed in farm implements, and in addition, it is simple, relatively inexpensive to construct, and easy to maintain. The control has been illustrated in conjunction with a pull-type combine, but it will be understood that controls in accordance with the invention can be readily embodied into self-propelled combines and other similar implements.

Various of the features of the invention believed to be new are set forth in the appended claims.

I claim:

1. In apparatus of the class described which is adapted to be moved about a field, a main frame, a crop gathering header hingedly supported on said main frame for movement in a generally vertical direction, power operated means for moving said header relative to said frame, said means including a rock shaft journalled for rotation on said main frame and extending transversely of the line of movement of said apparatus, means operatively connecting said rock shaft and said header whereby rotational movement of said rock shaft effects vertical movement of said header, a control arm attached at one end to said rock shaft for rotation therewith, power means operatively connected to the other end of said control arm for effecting the rotation of said rock shaft, and means for locking said header in a selected position, said locking means including a tie rod which extends from a point adjacent said rock shaft to a point remote therefrom, means for operatively connecting said rock shaft to the adjacent end of said tie rod, and means for releasably engaging the other end of said tie rod with said frame, said engaging means including a locking cam located on said frame and means which is operable to move said cam into engagement against said rod.

2. In apparatus of the class described, a main frame, a crop gathering header, means for hingedly supporting said header on said main frame to permit movement of said header in a generally vertical direction, power operated means for moving said header relative to said frame, said means for moving said header including a rock shaft journalled for rotation on said main frame, said rock shaft being generally parallel to the axis of said hinged header support, means operatively connecting said rock shaft and said header whereby rotational movement of said rock shaft effects vertical movement of said header, a radially extending control arm attached at one end to said rock shaft for rotation therewith, power means operatively connected to the other end of said control arm for effecting the rotation of said rock shaft, and means for locking said header in a selected position, said locking means including a tie rod which extends from a point adjacent said rock shaft to a point remote therefrom, means for connecting one end of said tie rod to said control arm to yieldingly resist downward movement of said header relative to said main frame, and means for releasably engaging the other end of said tie rod to said frame, said engaging means including a locking cam and a seat block, means for attaching said cam and said block to said frame, and means operable to move said cam whereby said tie rod is releasably engaged between said cam and said seat block.

3. In apparatus of the class described, a main frame, a crop gathering header hingedly supported on said main frame for movement in a generally vertical direction, power operated means for moving said header relative to said frame, said means including a rock shaft journalled on said main frame, means operatively connecting said rock shaft and said header whereby rotational movement of said rock shaft effects vertical movement of said header, a control arm attached at one end to said rock shaft, power means operatively connected to the other end of said control arm for effecting the rotation of said rock shaft, and means for locking said header in a selected position, said locking means including a tie rod which extends from a point adjacent said rock shaft to a point remote therefrom, means for connecting one end of said tie rod to said control arm, said connecting means including means for yieldingly resisting axial movement of said tie rod away from said control arm and means for limiting axial movement of said tie rod toward said control arm, and means for releasably engaging the other end of said tie rod to said frame, said engaging means including a locking cam and a seat block, means for attaching said cam and said block to said frame, and means operable to move said cam whereby said tie rod is engaged between said cam and said seat block.

4. In apparatus of the class described which is adapted to be moved about a field, a main frame, a crop gathering header extending transversely of the line of movement of said apparatus, means for hingedly supporting said header on said main frame for movement in a generally vertical direction, power operated means for moving said header relative to said frame, said means including a rock shaft journalled on said main frame, said rock shaft extending generally transversely of the line of movement of said apparatus, a header supporting arm which is connected at one end to said rock shaft, and link means connecting the other end of said header supporting arm to said header, a control arm attached at one end to said rock shaft, power means operatively connected to the other end of said control arm for rotating said rock shaft, and means for locking said header in a selected position, said locking means including a tie rod which extends from a point adjacent said rock shaft to a point remote therefrom, means for connecting one end of said tie rod to said control arm to yieldingly resist downward movement of said header, and means for releasably engaging the other end of said tie rod to said frame, said engaging means including a locking cam, a seat block, means for attaching said cam and said block to said frame, said seat block being supported for pivotal movement about an axis which is transversely disposed relative to the axis of said tie rod, and means operable to move said cam whereby said tie rod is engaged between said cam and said seat block.

5. In apparatus of the class described, a main frame having a forwardly extending portion which forms a drawbar, a crop gathering header hingedly supported on said main frame for movement in a generally vertical direction, power operated means for moving said header relative to said frame, said means including a transversely disposed rock shaft journalled on said main frame, means operatively connecting said rock shaft and said header whereby rotational movement of said rock shaft effects vertical movement of said header, a control arm attached at one end to said rock shaft, power means operatively connected to the other end of said control arm for effecting the rotation of said rock shaft, and means for locking said header in a selected position, said locking means including a tie rod which extends from a point adjacent said rock shaft to a point at the forward end of the drawbar portion of said main frame, means for connecting one end of said tie rod to said control arm, said connecting means including means for yieldingly resisting axial movement of said tie rod away from said control arm and means for limiting axial movement of said tie rod toward said control arm, and means for releasably engaging the other end of said tie rod to said drawbar portion, said engaging means including a locking cam and a seat block, means for attaching said cam and said block to said drawbar portion, and a locking lever which is attached to said cam and which extends forwardly to a position over the forward end of said drawbar portion, movement of said locking lever operating to move said cam whereby said tie rod is engaged between said cam and said seat block.

6. In apparatus of the class described which is adapted to be drawn through a field, a main frame having a forwardly extending portion which forms a drawbar, a crop gathering header extending transversely of the line of draft of said apparatus and being hingedly supported on said main frame for movement in a generally vertical direction, power operated means for moving said header reltaive to said frame, said means including a transversely extending rock shaft journalled for rotation on said main frame, a header supporting arm which is connected at one end to said rock shaft for rotation therewith, and link means connecting the other end of said header supporting arm to said header, a control arm attached at one end to said rock shaft for rotation therewith, power means operatively connected to the other end of said control arm for effecting the rotation of said rock shaft, and means for locking said header in a selected position, said locking means including a tie rod which extends from a point adjacent said rock shaft forwardly along said drawbar portion of said main frame, resilient means for connecting one end of said tie rod to said control arm to yieldingly resist downward movement of said header during operation, and means for releasably engaging the other end of said tie rod to said frame, said engaging means including a locking cam and a seat block, means for attaching said cam and said block to said frame, said seat block being supported for pivotal movement about an axis which is transversely disposed relative to the axis of said tie rod, and a locking lever which is attached to said cam and which extends forwardly to a position over the forward end of said drawbar portion, movement of said locking lever operating to move said cam whereby said tie rod is engaged between said cam and said seat block.

7. In apparatus of the class described, a main frame, a crop gathering header, means for hingedly supporting said header on said main frame for movement of said header in a generally vertical direction, means for moving said header relative to said main frame, said means including a rock shaft rotatably journalled on said main frame, said rock shaft being generally parallel to the axis of said hinged header support means, power means for effecting rotation of said rock shaft, said rock shaft being operatively connected to said header to raise or lower said header as said rock shaft is rotated, and additional means for connecting said rock shaft with said frame including a resilient element permitting limited movement of said rock shaft and including locking means which are automatically releasable in response to rotation of said rock shaft in one direction in excess of the amount of movement permitted by said resilient element.

8. In apparatus of the class described, a main frame, a crop gathering header hingedly supported on said main frame for movement in a generally vertical direction, power operated means for moving said header relative to said frame including a rock shaft which is disposed parallel to the axis of the hinged connection between said header and said frame and which is journalled for rotation on said frame, a header supporting arm, means connecting one end of said supporting arm to said rock shaft and the other end to said header, a control arm attached at one end to said rock shaft, and power means operatively connected to the other end of said control arm for effecting the rotation of said rock shaft and corresponding movement of said header, and additional means connecting said rock shaft with said frame, independently of said power operated means, for holding said header in any selected position, said additional means including a spring permitting limited movement of said header relative to the selected position and including locking means which are automatically releasable in response to movement of said header in one direction in excess of that permitted by said spring.

9. In apparatus of the class described, a main frame, a crop gathering header, means for hingedly supporting said header on said main frame, power operated means for moving said header about the axis of said hinged support means to thereby raise and lower said header relative to the ground, and additional means connecting said header with said frame for holding said header in any selected position and including a resilient means permitting limited oscillating vertical movement of said header relative to the selected position, the amount of movement being adjustably determined by said resilient means, and including locking members automatically releasable in response to upward movement of said header in excess of the amount permitted by said resilient means, said locking members being automatically reset to fix said header against movement relative to said frame at the uppermost point of upward movement of said header.

10. In apparatus of the class described, a main frame, a crop gathering header, means for hingedly supporting said header on said main frame, power operated means for moving said header about the axis of said hinged support means to thereby raise and lower said header relative to the ground, and means for holding said header in a selected position comprising a tie rod, a releasable locking means connecting one portion of said tie rod with said frame, and a spring connecting another portion of said tie rod with said header and permitting limited vertical movement of said header, in opposite directions, relative to the selected position, said locking means being responsive to upward movement of said header in excess of that permitted by said spring to release the engagement with said rod and permit continued upward movement of said header, said locking means automatically re-engaging said tie rod when the header reaches its uppermost position.

11. In apparatus of the class described, a main frame, a crop gathering header, means for hingedly supporting said header on said main frame, power operated means for moving said header about the axis of said hinged support means to thereby raise and lower said header relative to the ground, and means for holding said header in a selected position comprising a tie rod, a releasable locking means engaging said tie rod with said frame and including a locking cam located on said frame, means operable to move said cam into engagement with said tie rod, and a resilient element connecting said tie rod with said header and permitting limited oscillatory vertical movement of said header, said cam being proportioned and arranged to loosen its engagement with said tie rod in response to upward movement of said header beyond that permitted by said resilient means and to wedge against said tie rod as the header tends to move downwardly thereby locking said header in the raised position.

NORMAN R. KRAUSE.

REFERENCES CITED

The following references are of record in the file of this patent:

UNITED STATES PATENTS

| Number | Name | Date |
| --- | --- | --- |
| 2,319,458 | Hornish | May 18, 1943 |
| 2,325,870 | Mott | Aug. 3, 1943 |
| 2,366,587 | Armington | Jan. 2, 1945 |
| 2,452,153 | Ronning et al. | Oct. 26, 1948 |